US012592070B2

(12) United States Patent
Piao

(10) Patent No.: US 12,592,070 B2
(45) Date of Patent: Mar. 31, 2026

(54) IMAGE PROCESSING APPARATUS

(71) Applicant: NEC Corporation, Tokyo (JP)

(72) Inventor: Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/286,641

(22) PCT Filed: Apr. 26, 2021

(86) PCT No.: PCT/JP2021/016647

§ 371 (c)(1),
(2) Date: Oct. 12, 2023

(87) PCT Pub. No.: WO2022/230022

PCT Pub. Date: Nov. 3, 2022

(65) Prior Publication Data

US 2024/0212334 A1 Jun. 27, 2024

(51) Int. Cl.
*G06V 10/82* (2022.01)
*G06T 7/73* (2017.01)
(Continued)

(52) U.S. Cl.
CPC ................ *G06V 10/82* (2022.01); *G06T 7/73* (2017.01); *G06V 10/75* (2022.01); *G06V 10/762* (2022.01);
(Continued)

(58) Field of Classification Search
CPC ...... G06V 10/82; G06V 10/75; G06V 10/762; G06V 20/70; G06V 40/10; G06T 7/73;
(Continued)

(56) References Cited

U.S. PATENT DOCUMENTS 9,436,895 B1 9/2016 Jones et al.
2009/0196467 A1 8/2009 Okubo
(Continued)

FOREIGN PATENT DOCUMENTS

JP 2004-265231 A 9/2004
JP 2009-187186 A 8/2009
(Continued)

OTHER PUBLICATIONS

International Search Report for PCT Application No. PCT/JP2021/016647, mailed on Jun. 29, 2021.

*Primary Examiner* — Han Hoang
(74) *Attorney, Agent, or Firm* — Sughrue Mion, PLLC

(57) ABSTRACT

A registered object image storage unit stores at least one image of an object as a registered object image in association with an object identification number that uniquely identifies the object. The unknown object image acquisition unit acquires an unknown object image that is an image of an unknown object. An object re-identification unit re-identifies the acquired unknown object image by using the registered object image stored in the registered object image storage unit. When a condition that all registered object images stored in the registered object image storage unit in association with the object identification number of the object in the unknown object image whose re-identification succeeded differ from the unknown object image, a registered object image update unit adds the unknown object image to the registered object image storage unit as a new registered object image in association with the object identification number.

7 Claims, 9 Drawing Sheets

(51) Int. Cl.

| | |
|---|---|
| ***G06V 10/75*** | (2022.01) |
| ***G06V 10/762*** | (2022.01) |
| ***G06V 20/70*** | (2022.01) |
| ***G06V 40/10*** | (2022.01) |

(52) U.S. Cl.
CPC .............. *G06V 20/70* (2022.01); *G06V 40/10* (2022.01); *G06T 2207/20084* (2013.01); *G06T 2207/30196* (2013.01)

(58) Field of Classification Search
CPC . G06T 2207/20084; G06T 2207/30196; G06T 7/00
See application file for complete search history.

(56) References Cited

U.S. PATENT DOCUMENTS

2013/0022244 A1* 1/2013 Nagata .................... G06F 16/55 382/103
2015/0193686 A1* 7/2015 Chakravarty ........... G06F 21/32 706/48
2015/0234881 A1 8/2015 Hirata et al.
2017/0186022 A1 6/2017 Miyagi et al.
2019/0050629 A1* 2/2019 Olgiati ...................... G06T 7/20
2020/0104577 A1 4/2020 Uchida et al.
2021/0049390 A1* 2/2021 Wu ........................ G06V 40/10

FOREIGN PATENT DOCUMENTS

JP 2010-055594 A 3/2010
JP 2012-185769 A 9/2012
JP 2014-044606 A 3/2014
JP 2014-067171 A 4/2014
JP 2017-117384 A 6/2017
JP 2018-506788 A 3/2018
JP 2020-052822 A 4/2020
WO 2012/114727 A1 8/2012

* cited by examiner

IMAGE PROCESSING APPARATUS

This application is a National Stage Entry of PCT/JP2021/016647 filed on Apr. 26, 2021, the contents of all of which are incorporated herein by reference, in their entirety.

TECHNICAL FIELD

The present invention relates to an image processing apparatus, an image processing method, and a storage medium.

BACKGROUND ART

A technology of finding the same object from among a plurality of input images of objects captured at different points of time is called re-identification. Here, an object is a person or an article. Objects include belongings of a person such as a backpack and a bag, mobile bodies such as a car, a motorcycle, a ship, and an airplane, animals other than persons such as a dog and a cat, and objects other than persons. As a literature describing re-identification, Patent Literature 1 has been known, for example.

CITATION LIST

Patent Literature

Patent Literature 1: JP 2018-506788 A

SUMMARY OF INVENTION

Technical Problem

Re-identification of an unknown object is performed by using an image of a known object that is registered previously (registered object image). For example, feature values are extracted from both an image of an unknown object and an image of a known object and are compared with each other, and when they match, the unknown object is determined to the be the same object (same individual) as the known object. At that time, to the unknown object, an object identification number (object ID) having been assigned to the known object is assigned. In the case where only one registered object image is stored for one known object, re-identification cannot be made unless the image of the unknown object matches the only one registered object image. On the other hand, when various registered object images are stored for one known object, since it is only necessary that the image of the unknown object matches any one of the registered object images, the accuracy of re-identification is improved. However, when a plurality of registered object images are randomly stored for a known object, variations of the registered object images are not increased for an increase in the number of registered object images, and the accuracy of re-identification is not improved so much despite the fact that the processing speed for re-identification is lowered due to an increase in the number of times of re-identification.

The present invention provides an image processing apparatus that solves the above-described problem.

Solution to Problem

An image processing apparatus, according to one aspect of the present invention, is configured to include a registered object image storage unit that stores at least one image of an object as a registered object image in association with an object identification number that uniquely identifies the object;

an unknown object image acquisition unit that acquires an unknown object image that is an image of an unknown object;

an object re-identification unit that re-identifies the acquired unknown object image by using the registered object image stored in the registered object image storage unit; and a registered object image update unit that, when a condition is satisfied, the condition being that all registered object images stored in the registered object image storage unit in association with the object identification number of the object in the unknown object image whose re-identification by the object re-identification unit succeeded differ from the unknown object image, adds the unknown object image to the registered object image storage unit as a new registered object image in association with the object identification number.

Further, an image processing method, according to one aspect of the present invention, is configure to include acquiring an unknown object image that is an image of an unknown object;

re-identifying the acquired unknown object image by using a registered object image stored in a registered object image storage unit, the registered object image storage unit storing at least one image of an object as the registered object image in association with an object identification number that uniquely identifies the object; and when a condition is satisfied, the condition being that all registered object images stored in the registered object image storage unit in association with the object identification number of the object in the unknown object image whose re-identification succeeded differ from the unknown object image, adding the unknown object image to the registered object image storage unit as a new registered object image in association with the object identification number.

Further, a computer-readable medium, according to one aspect of the present invention, is configured to store thereon a program for causing a computer to execute processing to:

acquire an unknown object image that is an image of an unknown object;

re-identify the acquired unknown object image by using a registered object image stored in a registered object image storage unit, the registered object image storage unit storing at least one image of an object as the registered object image in association with an object identification number that uniquely identifies the object; and when a condition is satisfied, the condition being that all registered object images stored in the registered object image storage unit in association with the object identification number of the object in the unknown object image whose re-identification succeeded differ from the unknown object image, add the unknown object image to the registered object image storage unit as a new registered object image in association with the object identification number.

Advantageous Effects of Invention

With the configurations described above, the present invention can enhance the accuracy of re-identification by increasing variations of registered object images without uselessly increasing the number of registered object images, that is, without lowering the processing speed of re-identification.

DESCRIPTION OF EMBODIMENTS

Next, embodiments of the present invention will be described in detail with reference to the drawings.

First Exemplary Embodiment

Figure 1:
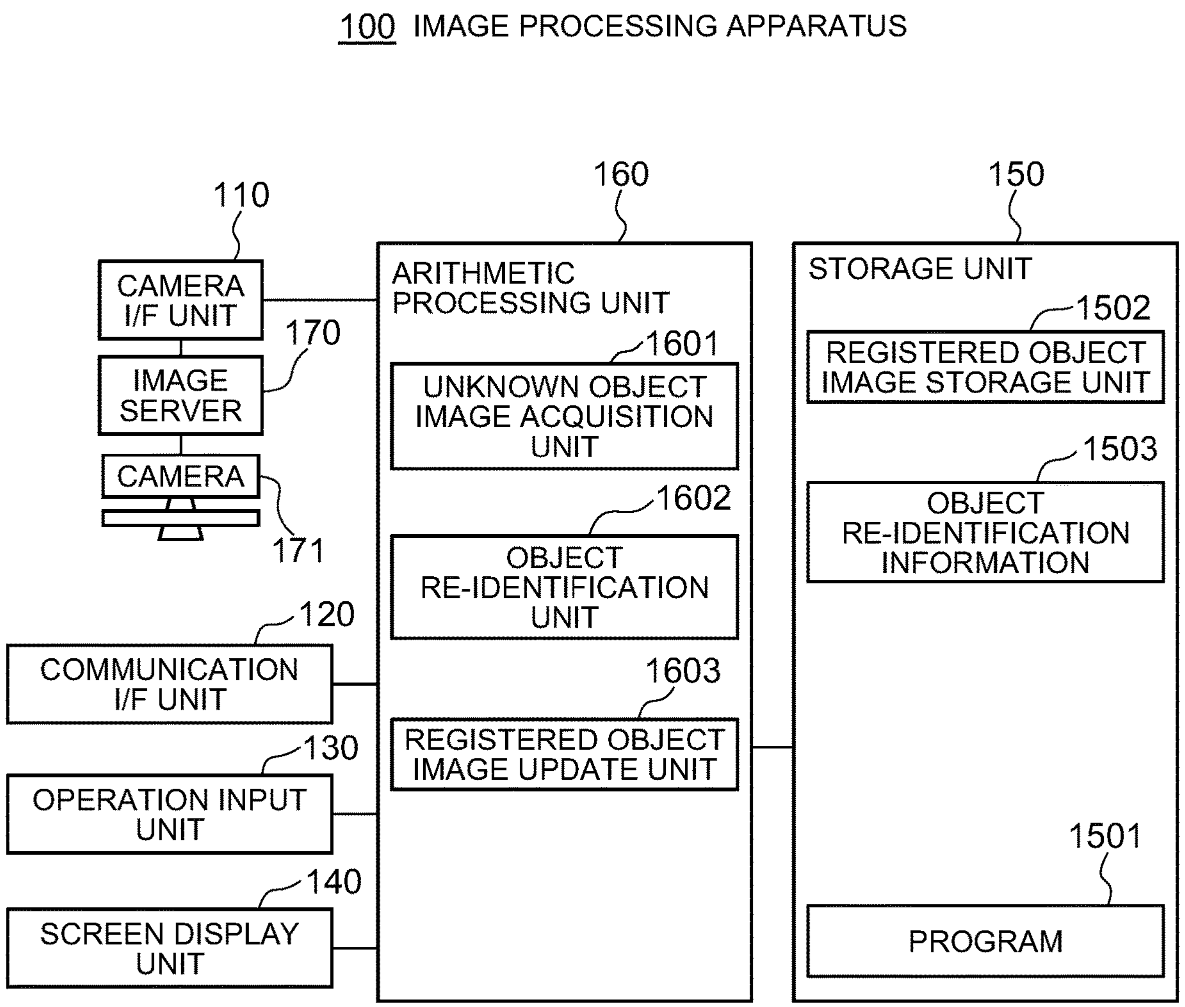
FIG. 1 is a block diagram illustrating an image processing apparatus according to a first exemplary embodiment of the present invention.

FIG. 1 is a block diagram illustrating an image processing apparatus 100 according to a first exemplary embodiment of the present invention. The image processing apparatus 100 is configured to re-identify an object. Here, an object may be a person. When an object is a person, the image processing apparatus 100 has a function of re-identifying a person. An object may be an article other than a person. When an object is an article other than a person, the image processing apparatus 100 has a function of re-identifying an article other than a person. Moreover, an object may include both a person and an article other than a person. When an object includes both a person and an article other than a person, the image processing apparatus 100 has both a function of re-identifying a person and a function of re-identifying an article other than a person. Referring to FIG. 1, the image processing apparatus 100 is configured to include a camera interface (I/F) unit 110, a communication I/F unit 120, an operation input unit 130, a screen display unit 140, a storage unit 150, and an arithmetic processing unit 160.

The camera I/F unit 110 is connected to an image server 170 in a wired or wireless manner, and is configured to transmit and receive data between the image server 170 and the arithmetic processing unit 160. The image server 170 is connected to a camera 175 in a wired or wireless manner, and is configured to accumulate a plurality of images captured by the camera 175 at different time in a past certain period. The camera 175 may be a color camera equipped with a charge-coupled device (CCD) image sensor or a complementary MOS (CMOS) image sensor having a pixel capacity of about several millions pixels. The camera 175 may be a camera installed on a street where a plurality of persons and goods come and go, in a room, or the like for the purpose of crime prevention and monitoring. The camera 175 may be a camera that captures the same or different imaging areas from a fixed place in a fixed capturing direction. Alternatively, the camera 175 may be a camera that is mounted on a moving object such as a car and captures the same or different imaging areas while moving. The number of cameras 175 is not limited to one. A plurality of cameras that capture different imaging areas from different places may be used.

The communication I/F unit 120 is configured of a data communication circuit, and is configured to perform data communication with an external device, not illustrated, in a wired or wireless manner. The operation input unit 130 is configured of operation input devices such as a keyboard and a mouse, and is configured to detect operation by an operator and output it to the arithmetic processing unit 160. The screen display unit 140 is configured of a screen display device such as a liquid crystal display (LCD), and is configured to display, on a screen, various types of information according to an instruction from the arithmetic processing unit 160.

The storage unit 150 is configured of storage devices such as a hard disk and a memory, and is configured to store therein processing information and a program 1501 necessary for various types of processing in the arithmetic processing unit 160. The program 1501 is a program for implementing various processing units by being read and executed by the arithmetic processing unit 160, and is read in advance from an external device or a storage medium, not illustrated, via a data input-output function of the communication I/F unit 120 and is stored in the storage unit 150. The main processing information stored in the storage unit 150 includes a registered object image storage unit 1502 and an object re-identification information 1503.

The registered object image storage unit 1502 is configured to store therein at least one registered object image that is an image of an object, in association with an object identification number that uniquely identifying the object (individual).

The object re-identification information 1503 is information representing the result of object re-identification. The object re-identification information 1503 is configured to include, for example, information specifying a frame image (for example, camera ID and captured time), an object image of each object detected from the frame image and the position information thereof, and an object identification number of each re-identified object. Note that the object re-identification information 1503 is also referred to as an object re-identification information storage unit.

The arithmetic processing unit 160 has a processor such as an MPU and its peripheral circuits, and is configured to read and execute the program 1501 from the storage unit 150 to allow the hardware and the program 1501 to cooperate with each other to implement the various processing units. The main processing units implemented by the arithmetic processing unit 160 include an unknown object image acquisition unit 1601, an object re-identification unit 1602, and a registered object image update unit 1603.

The unknown object image acquisition unit 1601 is configured to acquire, from the image server 170 via the camera I/F unit 110, frame images constituting a moving image captured by the camera 175 or frame images obtained by down-sampling them. To each of the acquired frame images, the camera ID and the captured time are added. The captured time of a frame image differs for each frame. The unknown object image acquisition unit 1601 is also configured to detect an unknown object image from the acquired frame image. An unknown object image is an image inside the bounding rectangle of an image of the whole object existing in the frame image, for example. In the case of a person, for example, an unknown object image is an image inside the bounding rectangle of an image of the whole body of the person. In the case of an article, an unknown object image is an image inside the bounding rectangle of an image of the whole article.

The unknown object image acquisition unit 1601 is configured to, for example, by inputting a frame image to a learning model having been learned through machine learning for estimating an object image from the frame image, acquire an object image existing in the frame image as an unknown object image from the learning model. The learning model can be generated in advance through machine learning using a machine learning algorism such as a neural network by using various frame images and various object images in the frame images as teacher data. However, the method of detecting an unknown object image from a frame image is not limited to that described above. Another method such as pattern matching may be used.

The unknown object image acquisition unit 1601 is configured to add, to the detected unknown object image, a provisional object ID, a camera ID, captured time, and position information of the unknown object image on the frame image, and transmit them to the object re-identification unit 1602. The position information of the unknown object image may be coordinate information specifying the bounding rectangle of the unknown object image, for example.

The object re-identification unit 1602 is configured to re-identify an unknown object image transmitted from the unknown object image acquisition unit 1601 by using registered object images stored in the registered object image storage unit 1502 in the storage unit 150.

The object re-identification unit 1602 is configured to, for example, input the unknown object image and one of the registered object images to a first learning model having been learned by machine learning for estimating whether or not the two object images are object images of the same object, and acquire an estimation result with a probability of whether or not they are object images of the same object, from the first learning model. The first learning model can be generated in advance by machine learning using a machine learning algorism such as a neural network by using various pairs of object images of the same object and various pairs of object images of different objects as teacher data. The object re-identification unit 1602 determines, for example, that the unknown object image is the same object as the registered object image when the probability is equal to or higher than a predetermined threshold probability. The object re-identification unit 1602 determines that the unknown object image is not the same object as the registered object image when the probability is lower than the predetermined threshold probability. In that case, when another registered object image is stored in the registered object image storage unit 1502, the object re-identification unit 1602 repeats re-identification of the unknown object image by using the other registered object image. Then, in the case where an estimation result that is equal to or higher than the threshold probability is not acquired even performing re-identification of the unknown object image by using all registered object images or those within a predetermined range, the object re-identification unit 1602 determines that the unknown object image shows an newly appearing object, and adopts and assigns a new object identification number to the object. Further, the object re-identification unit 1602 stores the unknown object image as a newly appearing registered object image in the registered object image storage unit 1502 in association with the object identification number.

In the above description, object re-identification is performed by directly inputting an image to the learning model. However, it is also possible to extract a feature value appropriate for object re-identification from the image, and perform re-identification by inputting the feature value to the learning model. Moreover, the method of object re-identification is not limited to that described above. It is possible to use another method such as a method of determining whether or not a distance between feature vectors extracted from two object images is a predetermined distance or shorter. Furthermore, the object re-identification unit 1602 may calculate, for each object identification number, a statistical value (for example, average value, maximum value) by obtaining the probability between each of one or more registered object images stored in association with the object identification number and the unknown object image, and determine that the unknown object image is the same object as the registered object image when the statistical value is equal to or larger than a threshold.

The object re-identification unit 1602 creates the object re-identification information 1503 representing the result of object re-identification performed on the unknown object image, and stores it in the storage unit 150. The object re-identification information 1503 stored in the storage unit 150 may be used for selecting a registered object image to be used for re-identification when the object re-identification unit 1602 performs re-identification of an object image in a new frame image. Alternatively, the object re-identification information 1503 may be displayed on the screen display unit 140, and/or transmitted to an external device via the communication I/F unit 120. Alternatively, the object re-identification information 1503 may be used as input data to an application program for monitoring the behavior of persons and articles. As an example of monitoring the behavior of a person and an object, monitoring suspicious persons and suspicious articles (for example, desertion, carrying-away, switching, shoplifting) may be conceived.

The object re-identification unit 1602 is also configured to, upon success of re-identification of the unknown object image, transmit re-identification success information including the object identification number of the re-identified object and the unknown object image to the registered object image update unit 1603. The object re-identification unit 1602 is also configured to, upon failure of re-identification of the unknown object image, that is, when there is no registered object image matching the unknown object image, transmit re-identification failure information including the unknown object image that is not re-identified to the registered object image update unit 1603.

The registered object image update unit 1603 updates the registered object image storage unit 1502 on the basis of the re-identification failure information or the re-identification success information received from the object re-identification unit 1602. Specifically, when receiving re-identification failure information from the object re-identification unit 1602, the registered object image update unit 1603 registers the unknown object image in the registered object image storage unit 1502 as a registered object image, in association with the object identification number adopted for the object of the unknown object image not re-identified.

On the contrary, when receiving re-identification success information from the object re-identification unit 1602, the registered object image update unit 1603 first reads out all registered object images stored in the registered object image storage unit 1502 in association with the object identification number of the object of the unknown object image in which re-identification succeeded. Then, for each pair of the unknown object image and a registered object image, the registered object image update unit 1603 checks whether or not they match. For example, the registered object image update unit 1603 calculates the similarity between the unknown object image and the registered object image, and when the calculated similarity is equal to or smaller than a predetermined threshold, the registered object image update unit 1603 determines that they match, but otherwise determines that they do not match. Then, when the registered object image update unit 1603 determines that the unknown object image and the registered object image do not match in all pairs, the registered object image update unit 1603 adds the unknown object image to the registered object image storage unit 1502 as a new registered object image, in association with the object identification number of the object of the unknown object image. At that time, the registered object images having been registered in the registered object image storage unit 1502 will not be deleted but kept. As a result, variations of the registered object image that can be used for re-identification of the object are increased by one.

Meanwhile, when at least one pair of the unknown object image and a registered object image match, the registered object image update unit 1603 performs a process (A) or a process (B) described below.

(A) The registered object image update unit 1603 deletes one registered object image that matches the unknown object image from the registered object image storage unit 1502 and instead, adds the unknown object image as a new registered object image to the registered object image storage unit 1502. As a result, the registered object image is replaced with the latest one although the variations of the registered object images that can be used for re-identification of the object are not changed.

(B) The registered object image update unit 1603 performs neither addition of the unknown object image to the registered object image storage unit 1502 nor deletion of the registered object image from the registered object image storage unit 1502. As a result, it is possible to prevent the number of registered object images from being increased uselessly like the case of randomly adding the unknown object image to the registered object image storage unit 1502.

Figure 2:
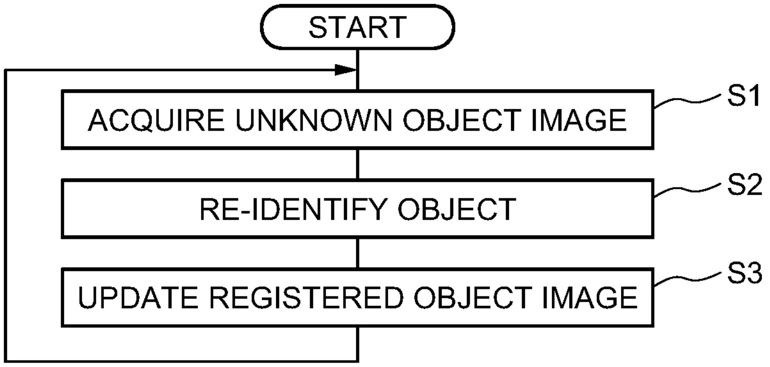
FIG. 2 is a flowchart illustrating an exemplary operation of the image processing apparatus according to the first exemplary embodiment of the present invention.

Next, operation of the image processing apparatus 100 will be described. FIG. 2 is a flowchart illustrating an exemplary operation of the image processing apparatus 100.

Referring to FIG. 2, the unknown object image acquisition unit 1601 first acquires, from the image server 170 via the camera I/F unit 110, a frame image captured by the camera 175, and acquires an unknown object image from the frame image (step S1).

Then, the object re-identification unit 1602 re-identifies the acquired unknown object image by using one or more registered object images stored in the registered object image storage unit 1502 (step S2).

Then, the registered object image update unit 1603 updates the registered object image storage unit 1502 on the basis of a result of re-identification of the unknown object image by the object re-identification unit 1602 (step S3). Specifically, when re-identification failed, the registered object image update unit 1603 registers the unknown object image in the registered object image storage unit 1502 as a registered object image, in association with the object identification number adopted for the object of the unknown object image not re-identified. Meanwhile, when re-identification of the object succeeded, the registered object image update unit 1603 checks, for each pair of the unknown object image and each of all registered object images stored in the registered object image storage unit 1502 in association with the object identification number of the object in the unknown object image whose re-identification succeeded, whether or not the two match, and when all pairs do not match, adds the unknown object image to the registered object image storage unit 1502 as a new registered object image, in association with the object identification number of the object in the unknown object image. On the contrary, when at least one pair of the unknown object image and a registered object image match, the registered object image update unit 1603 performs the process (A) or the process (B).

Upon completion of the process of step S3, the image processing apparatus 100 returns to step S1 and repeats the same process as that described above. Thereby, when there is another unknown object image in the frame image captured by the camera 175, for each unknown object image, acquisition of an unknown object image (step S1), re-identification of the unknown object image (step S2), and update of the registered object image storage unit 1502 based on the re-identification result (step S3) are repeated. When the processes of steps S1 to S3 are completed for all unknown object images existing in one frame image, the next frame image is acquired, and the same processes as those performed on the previous frame image are repeated.

As described above, according to the image processing apparatus 100 of the present embodiment, it is possible to enhance the accuracy of re-identification by increasing the variations of registered object images without uselessly increasing the number of registered object images, that is, without lowering the processing speed of re-identification. This is because upon success of object re-identification, the registered object image update unit 1603 checks, for each pair of the unknown object image and each of all registered object images stored in the registered object image storage unit 1502 in association with the object identification number of the object in the unknown object image whose re-identification succeeded, whether or not the two match, and when all pairs do not match, adds the unknown object image to the registered object image storage unit 1502 as a new registered object image, in association with the object identification number of the object in the unknown object image.

Next, the registered object image update unit 1603 will be described in more detail.

As a method of registering a plurality of different images for the same object, two methods will be considered. A first method is a method including previously determining conditions for a plurality of different images, and determining whether a newly acquired image satisfies one of the conditions not satisfied by the registered images. A second method is a method including unconditionally registering the first acquired image, and for an image acquired secondly or later, determining whether or not it is an exceptional image not belonging to any of one or more clusters obtained by clustering one or more registered images by means of one-class identification plane, and determining propriety of registration according to the determination result.

In the case where the registered object image update unit 1603 uses the first method, various conditions can be conceived. For example, as the conditions, different postures of an object may be used. Alternatively, as the conditions, presence or absence of accessories (belongings) of an object or the type thereof may be used. For example, in the case of a person, a person not having any belongings, a person having a backpack as belongings, a person having a handbag as belongings, may be used as conditions for different images.

In the case where the registered object image update unit 1603 uses the second method, it is considered to extract a predetermined feature value from an image, and perform clustering according to the degree of similarity of the extracted feature value. Various types of feature values may be considered. For example, a feature value representing the posture of an object or a feature value representing presence or absence of an accessory of an object and the type thereof may be used.

Next, a specific example of the registered object image update unit 1603 will be described.

Example 1 of Registered Object Image Update Unit 1603

Figure 3:
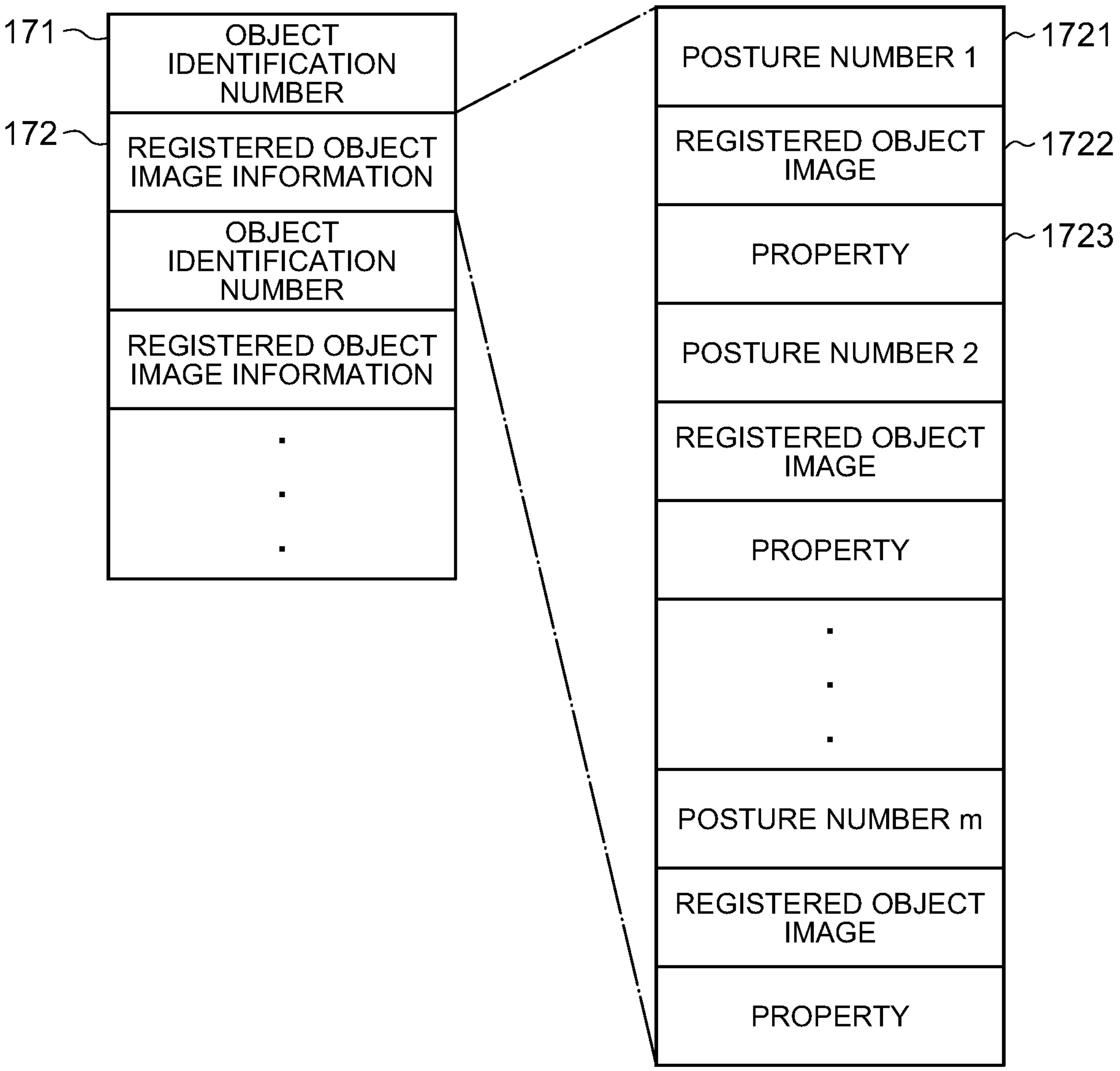
FIG. 3 illustrates an exemplary format of information stored in a registered object image storage unit in the image processing apparatus according to the first exemplary embodiment of the present invention.

FIG. 3 illustrates an exemplary format of information stored in the registered object image storage unit 1502 in association with the registered object number that uniquely identifies an object. Referring to FIG. 3, the registered object image storage unit 1502 includes as many pairs of the object identification number 171 and the registered object image information 172 as the registered objects. In the field of the object identification number 171, a registered object number that uniquely identifies a registered object is set. In the field of the registered object image information 172, information of the registered object image to be used for re-identification of the registered object specified by the registered object number 171 is set. In the example shown in FIG. 3, the registered object image information 172 includes "m" sets of a posture number 1721, a registered object image 1722, and a property 1723.

In the field of the posture number 1721, a number defining one posture, when the postures of an object are classified into m types, is set in advance. In the field of the registered object image 1722, a registered object image matching the posture defined by the posture number set in the posture number 1721 is set. In the field of the property 1723, a camera ID, capturing time, and the like, added to the frame image in which the registered object image set in the registered object image 1722 is included, is set. When there is no registered object image corresponding to the posture number 1721, NULL value is shown in the fields of the registered object image 1722 and the property 1723, for example. In the present example, one registered object image is registered with one posture number. However, as another embodiment, two or more registered object images may be registered with one posture number.

Various methods are conceivable for detecting the posture of an object from an object image. In the below description, an example of detecting the posture of an object by using skeletal information of the object will be described. This method is applicable when an object is a person. Even in the case where an object is other than a person, this method is applicable when the object is a living thing having a skeleton such as a dog or a cat.

First, the registered object image update unit 1603 detects skeletal information of an object from an object image. For example, human skeletal information includes information representing positions of joints constituting the human body. Joints may include not only joints of a neck or shoulders but also parts of a face such as eyes and a nose. The skeletal information may include reliability (likelihood of feature recognition) for each joint, in addition to the position of each joint. For example, the registered object image update unit 1603 may realize skeletal information of an object in an image by using a system that estimates it by deep learning. Such a system includes OpenPose, HRNet, AlphaPose, or the like, for example. For example, OpenPose extracts positions (x, y coordinates) and reliabilities of eighteen joints such as nose, neck, right shoulder, right elbow, right wrist, left shoulder, left elbow, left wrist, right hip, light knee, right ankle, left hip, left knee, left ankle, right eye, right ear, left eye, and left ear. However, a method of detecting skeletal information from an object image is not limited to that described above, and any method can be used.

Next, the registered object image update unit 1603 determines the posture of the object from the detected skeletal information. As a method of determining the posture of the object from the skeletal information, a method described below may be used for example.

First, the registered object image update unit 1603 acquires position information of a predetermined pair of joints that are present symmetrically at left and right, from the skeletal information. There are some pairs of joints that are present symmetrically at leaf and right. In the case of a person, it is desirable to acquire position information of a joint pair of the left shoulder and the right shoulder that largely affects the posture. Then, the registered object image update unit 1603 calculates a normal direction of a vector from one (for example, a joint of the left shoulder) to the other (for example, a joint of the right shoulder) of the pair. Since there are two directions vertical to the vector, a predetermined one direction is defined as the normal direction. Then, the registered object image update unit 1603 determines which of the reference directions corresponding to the predetermined "m" types of posture numbers the normal direction matches. For example, in the case of m=8, the reference directions corresponding to the "m" types of posture numbers may be 0°, 45°, 90°, 135°, 180°, 225°, 270°, and 315°. Moreover, the registered object image update unit 1603 calculates the angle of a difference between the determined normal direction and each reference direction, and determines the posture number corresponding to the reference direction in which the absolute value of the angle of the difference becomes minimum to be the posture of the object. For example, when the normal direction is 5°, the registered object image update unit 1603 determines that it is the posture of the posture number corresponding to the reference direction 0°. However, the method of determining the posture of the object from the skeletal information and the number of types of postures are not limited to those described above.

Figure 4:
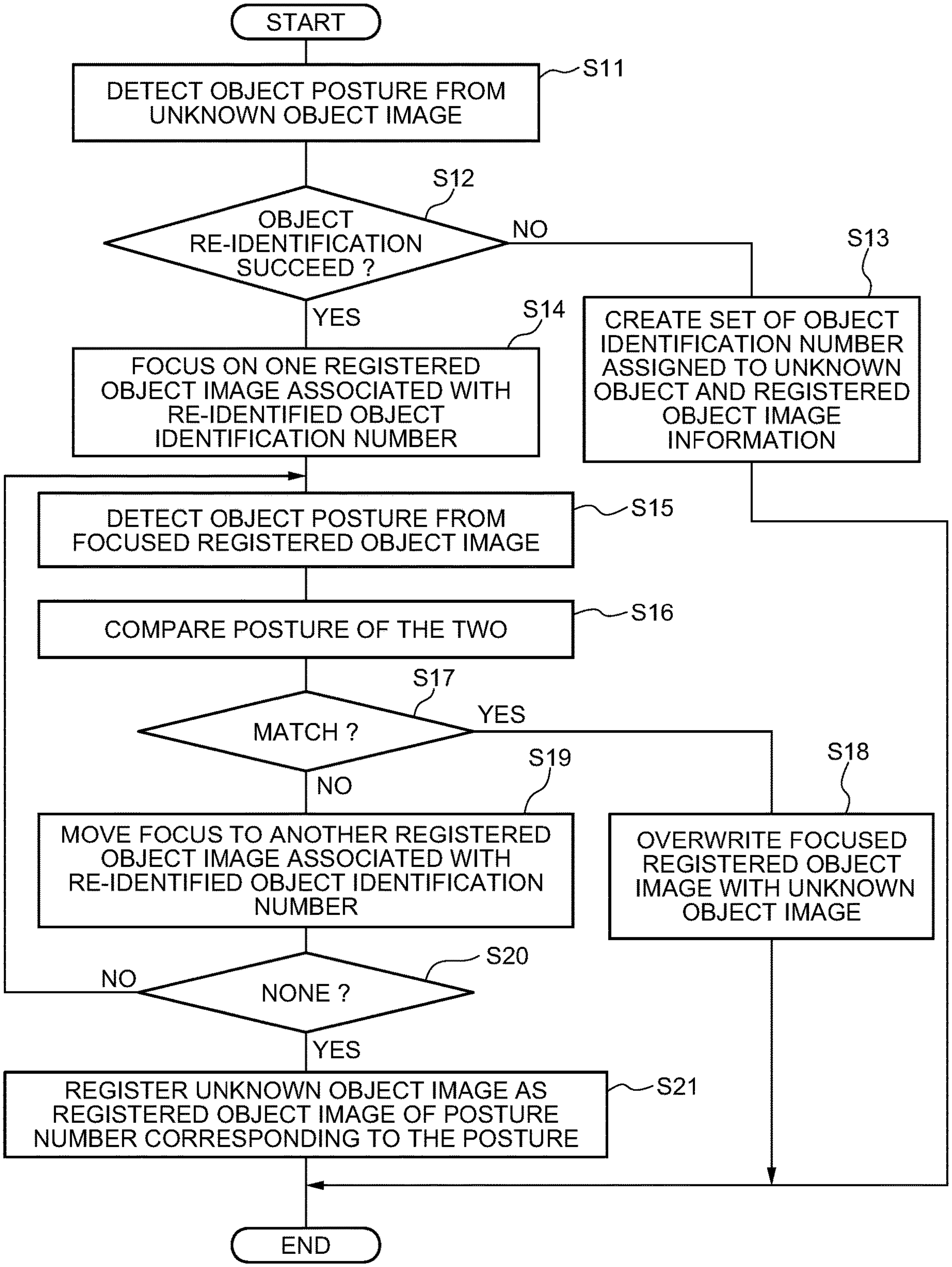
FIG. 4 is a flowchart illustrating exemplary processing by a registered object image update unit in the image processing apparatus according to the first exemplary embodiment of the present invention.

FIG. 4 is a flowchart illustrating exemplary processing by the registered object image update unit 1603. Referring to FIG. 4, the registered object image update unit 1603 first determines the position of an object that is an unknown object from an unknown object image included in re-identification success information or re-identification failure information transmitted from the object re-identification unit 1602 (step S11). Then, the registered object image update unit 1603 determines whether the object re-identification succeeded or failed (step S12). Then, when the object re-identification failed, the registered object image update unit 1603 creates a set of a new object identification number 171 and registered object image information 172 for the current object that is an unknown object, in the registered object image storage unit 1502 (step S13). Specifically, the registered object image update unit 1603 adopts a new object identification number for the current object, and sets the adopted object identification number in the field of the object identification number 171 that is newly secured in the registered object image storage unit 1502. Further, the registered object image update unit 1603 sets the current unknown object image and its property in the fields of the registered object image 1722 and the property 1723 of the same set as the posture number 1721 that matches the posture detected from the object image in the newly secured registered object image information 172.

Then, the registered object image update unit 1603 ends the processing of FIG. 4.

On the other hand, when the object re-identification succeeded, the registered object image update unit 1603 focuses on one of the registered object images 1722 registered in the registered object image storage unit 1502 in association with the re-identified object identification number (step S14). Then, the registered object image update unit 1603 determines the posture of the registered object from the focused registered object image 1722 (step S15), and compares it with the posture of the unknown object image determined at step S11 (step S16). Then, when the two postures match (YES at step S17), the registered object image update unit 1603 overwrites the focused registered object image 1722 stored in the registered object image storage unit 1502 with the unknown object image (step S18). At that time, the corresponding property 1723 is overwritten with that of the unknown object image. Then, the registered object image update unit 1603 ends the processing of FIG. 4.

Meanwhile, when the two postures do not match (NO at step S17), the registered object image update unit 1603 moves the focus to the next registered object image 1722 associated with the re-identified object identification number (step S19), returns to step S15 via step S20, and with respect to the newly focused registered object image 1722, repeats the same process as that described above. Then, upon completion of the process with respect to all registered object images 1722 stored in the registered object image storage unit 1502 associated with the re-identified object identification number (that is, when the posture does not match any of the registered object image) (YES at step S20), the registered object image update unit 1603 executes step S21. At step S21, the registered object image update unit 1603 registers the set of the unknown object image and its property in the registered object image storage unit 1502 as a set of the registered object image 1722 and the property 1723 of the posture number corresponding to the posture. Then, the registered object image update unit 1603 ends the processing of FIG. 4.

Example 2 of Registered Object Image Update Unit 1603

Figure 5:
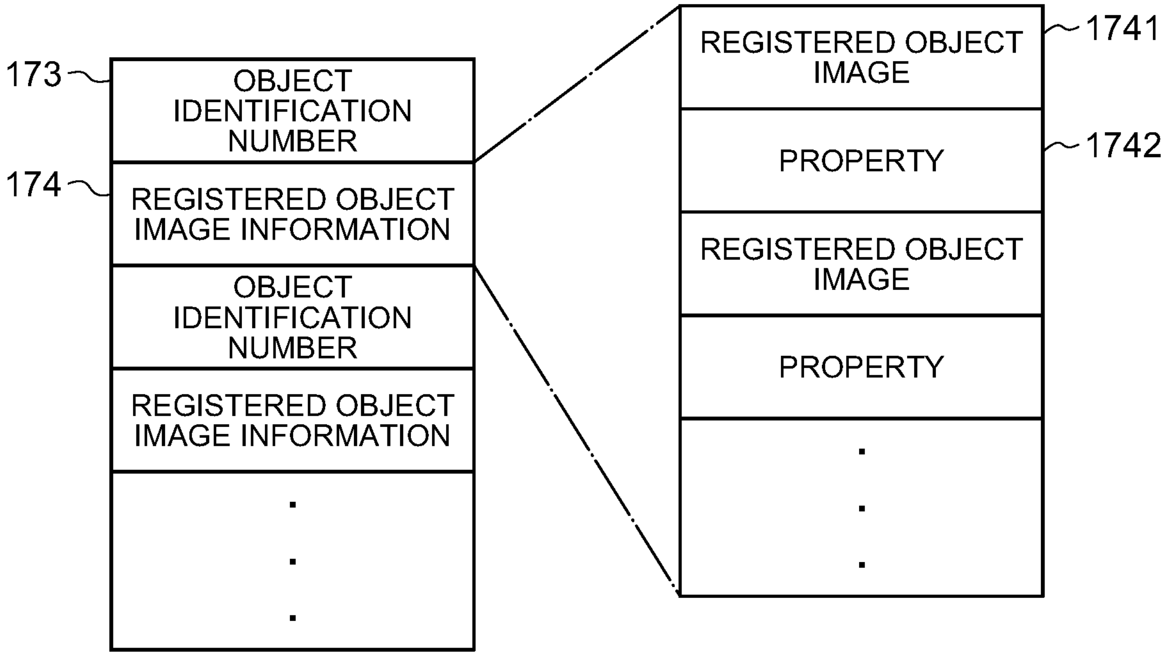
FIG. 5 illustrates another exemplary format of information stored in a registered object image storage unit in the image processing apparatus according to the first exemplary embodiment of the present invention.

FIG. 5 illustrates another exemplary format of information stored in the registered object image storage unit 1502 in association with a registered object number that uniquely identifies an object. Referring to FIG. 5, the registered object image storage unit 1502 includes as many pairs of the object identification number 173 and the registered object image information 174 as the registered objects. In the field of the object identification number 173, a registered object number that uniquely identifies a registered object is set. In the field of the registered object image information 174, information of the registered object image to be used for re-identification of the registered object specified by the registered object number 173 is set. In the example shown in FIG. 5, the registered object image information 174 includes one or more sets of a registered object image 1741 and a property 1742. Here, the upper limit of the number of registered object images registered for one object identification number may be set or may not be set.

In the field of the registered object image 1741, an object image of the registered object is set. In the field of the property 1742, a camera ID, capturing time, and the like, added to the frame image in which the registered object image set in the registered object image 1741 is included, are set.

Figure 6:
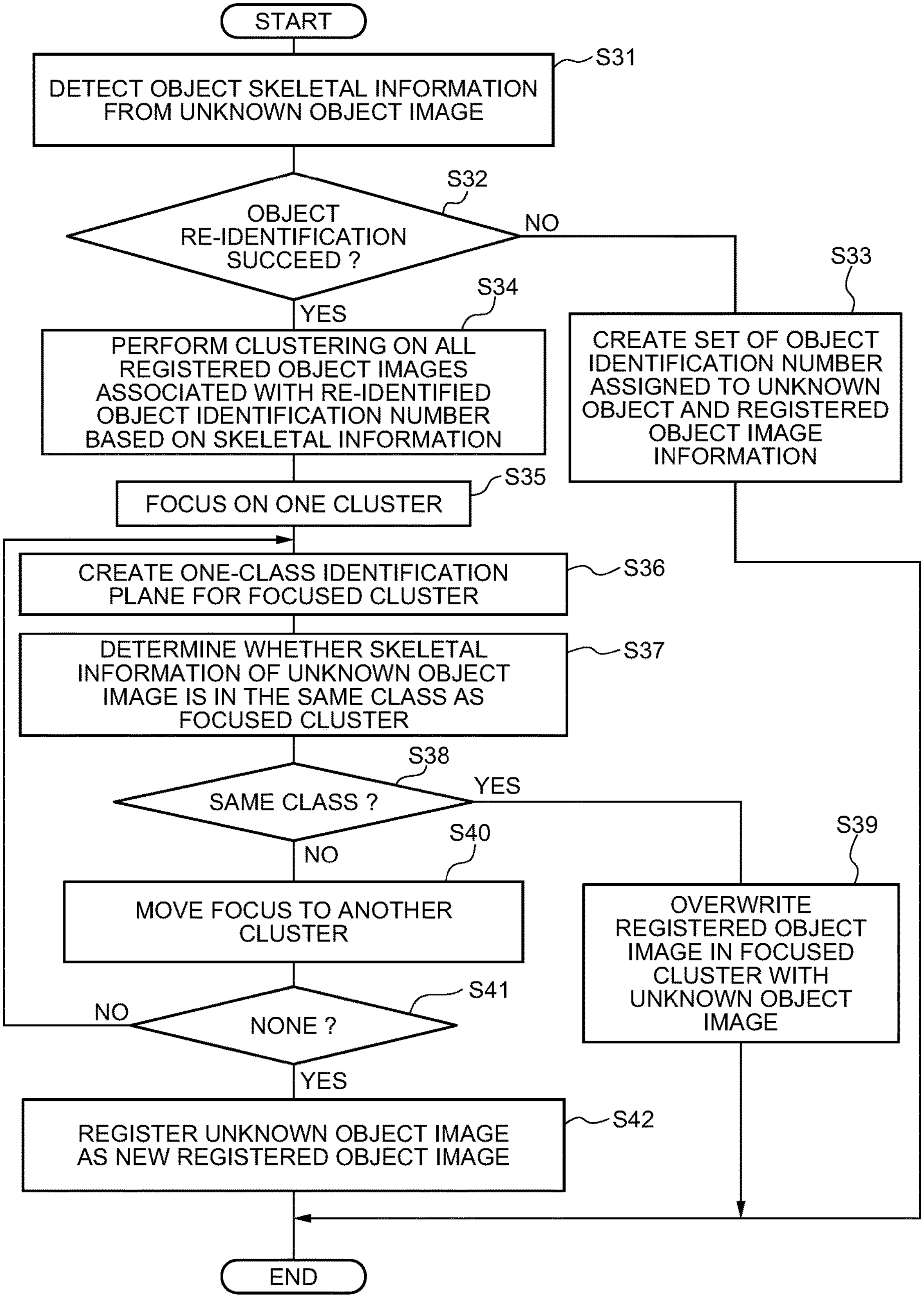
FIG. 6 is a flowchart illustrating exemplary processing by a registered object image update unit in the image processing apparatus according to the first exemplary embodiment of the present invention.

FIG. 6 is a flowchart illustrating exemplary processing by the registered object image update unit 1603. Referring to FIG. 6, the registered object image update unit 1603 first detects skeletal information of an object that is an unknown object from an unknown object image included in re-identification success information or re-identification failure information transmitted from the object re-identification unit 1602 (step S31). Then, the registered object image update unit 1603 determines whether the object re-identification succeeded or failed (step S32). Then, when the object re-identification failed, the registered object image update unit 1603 creates a set of the new object identification number 173 and the registered object image information 174 for the current object that is an unknown object, in the registered object image storage unit 1502 (step S33). Specifically, the registered object image update unit 1603 adopts a new object identification number for the current object, and sets the adopted object identification number in the field of the object identification number 173 that is newly secured in the registered object image storage unit 1502. Moreover, the registered object image update unit 1603 sets, in the newly secured registered object image information 174, a set of the registered object image 1741 in which the current unknown object image is set and the property 1742. Then, the registered object image update unit 1603 ends the processing of FIG. 6.

On the other hand, when the object re-identification succeeded, the registered object image update unit 1603 performs clustering on all registered object images 1741 registered in the registered object image storage unit 1502 in association with the re-identified object identification number, on the basis of the skeletal information extracted therefrom (step S34). Then, the registered object image update unit 1603 focuses on one cluster obtained by the clustering (step S35), and creates one-class identification plane of the focused cluster (step S36). Then, the registered object image update unit 1603 determines whether or not the skeletal information of the unknown object image is in the same class as that of the focused cluster, by using the created one-class identification plane (step S37). Then, when they are determined to be in the same class (YES at step S38), the registered object image update unit 1603 overwrites one of the registered object images 1741 in the focused cluster stored in the registered object image storage unit 1502 with the unknown object image (step S39). At that time, the corresponding property 1742 is overwritten with that of the unknown object image. Then, the registered object image update unit 1603 ends the processing of FIG. 6.

Meanwhile, when they are determined not to be in the same class (NO at step S38), the registered object image update unit 1603 moves the focus to another cluster generated by the clustering (step S40), returns to step S36 via step S41, and with respect to the newly focused cluster, repeats the same process as that described above. Then, upon completion of the process with respect to all created clusters (that is, when the joint information of the unknown object image does not belong to any of the clusters) (YES at step S41), the registered object image update unit 1603 executes step S42. At step S42, the registered object image update unit 1603 registers the set of the unknown object image and its property in the registered object image storage unit 1502, as a set of the registered object image 1741 and the property 1742 corresponding to the re-identified object identification number 173. Then, the registered object image update unit 1603 ends the processing of FIG. 6.

Next, the object re-identification unit 1602 will be described in more detail.

Figure 7:
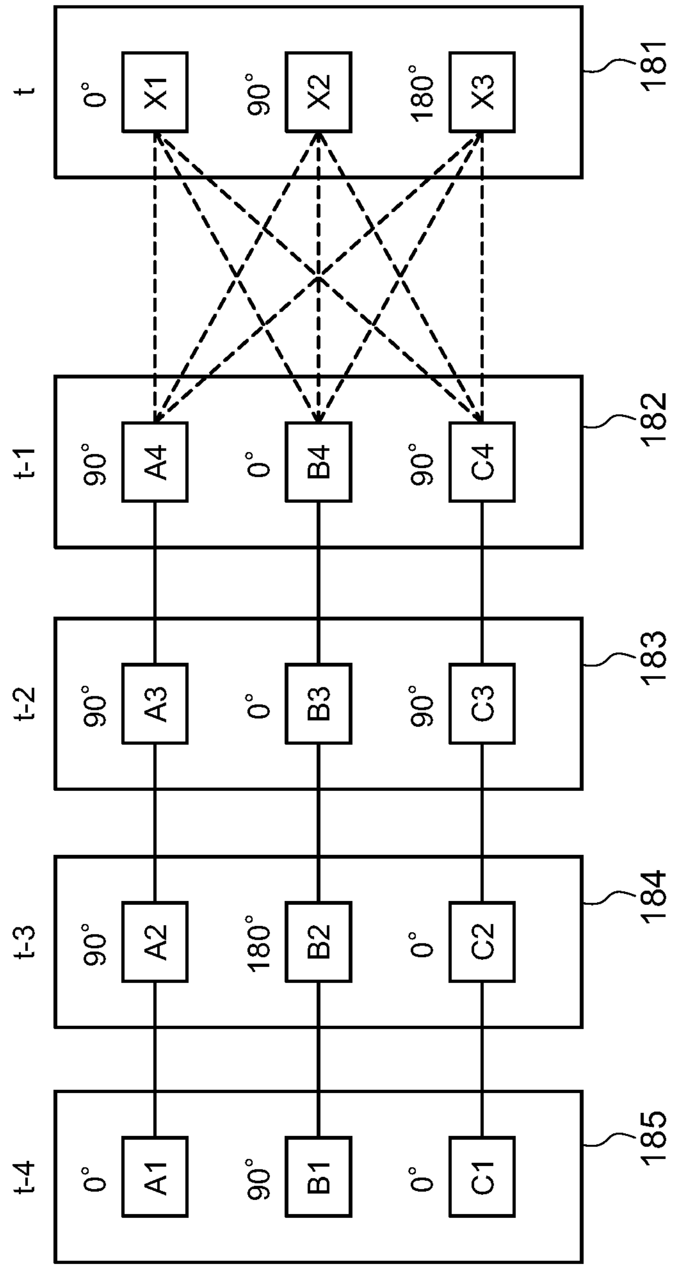
FIG. 7 is a schematic diagram for explaining an exemplary method of selecting a registered object image to be used for re-identification by an object re-identification unit in the image processing apparatus according to the first exemplary embodiment of the present invention.

FIG. 7 is a schematic diagram for explaining an example of a method of selecting a registered object image to be used for re-identification by the object re-identification unit 1602. In FIG. 7, a frame image 181 is a frame image to be re-identified by the object re-identification unit 1602, and includes three unknown object images X1 to X3 detected by the unknown object image acquisition unit 1601. On the other hand, frame images 182, 183, 184, and 185 are frame images that are one frame, two frames, three frames, and four frames before the frame image 181, respectively. In each of the frames 182 to 185, three object images are included, and are re-identified by the object re-identification unit 1602. That is, in the three object images, one is re-identified as a person A, another one is re-identified as a person B, and the other one is re-identified as a person C. The re-identified information thereof is included in the object re-identification information 1503. In FIG. 7, images of the person A in the respective frames are distinguished as A1, A2, A3, and A4 Similarly, images of the person B in the respective frames are distinguished as B1, B2, B3, and B4, and images of the person C in the respective frames are distinguished as C1, C2, C3, and C4.

Figure 8:
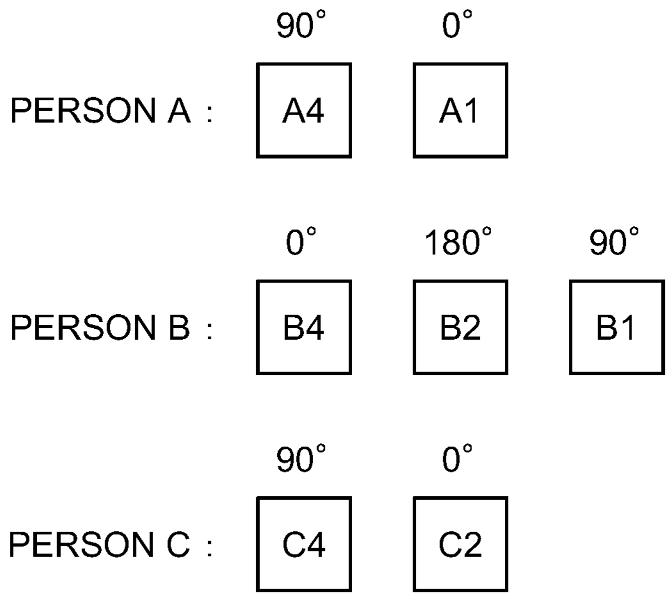
FIG. 8 is a schematic diagram illustrating an example of a registered object image stored in the registered object image storage unit in the image processing apparatus according to the first exemplary embodiment of the present invention.

Further, in FIG. 7, the angle added to each image represents the posture of the person in the image. The posture of the person A in the image A1 is 0°, and the postures in the images A2, A3, and A4 are the same at 90°. Therefore, in the registered object image storage unit 1502, the images A4 and A1 are registered in association with the object identification number of the person A as illustrated in FIG. 8, and the images A2 and A3 are not registered. Similarly, in the registered object image storage unit 1502, the images B4, B2, and B1 and the images C4 and C2 are registered in association with the object identification numbers of the person B and the person C as illustrated in FIG. 8, and the images B3, C1, and C3 are not registered.

When the object re-identification unit 1602 performs re-identification of an unknown object image X1 in the latest frame image 181, the object re-identification unit 1602 re-identifies the unknown object image X1 by using the registered object images, illustrated in FIG. 8, that are stored in the registered object image storage unit 1502 in association with the object identification numbers of the persons A, B, and C whose re-identification succeeded in one or more most recent frame images 182 to 185. That is, the object re-identification unit 1602 calculates the probability that the unknown object image X1 shows the same person as that of the image A4 by using the learning model having been learned for example, and when the probability is equal to or larger than a threshold, the object re-identification unit 1602 determines that the person of the unknown object image X1 is the person A. Meanwhile, when the probability is less than the threshold, the object re-identification unit 1602 calculates the probability that the person of the unknown object image X1 is the same as that of the image A1, and when the probability is equal to or larger than the threshold, the object re-identification unit 1602 determines that the person of the unknown object image X1 is the person A. When the probability is still less than the threshold, the object re-identification unit 1602 attempts to re-identify the unknown object image X1 by sequentially using the remaining registered images, namely, the images B4, B2, B1, C4, and C2. As described above, in the case of re-identifying one unknown object image X1 in the latest frame image 181 as a registered object image of a person re-identified in the most recent four frames, in the present embodiment, it is possible to limit to seven pieces of registered object images in total (A1, A4, B1, B2, B4, C2, and C4). In contrast, in the configuration in which images of the person re-identified in the most recent four frames are directly used as registered object images, re-identification is performed on twelve pieces of registered object images in total with respect to the unknown object image X1. Therefore, the processing speed of re-identification is lowered.

Further, the object re-identification unit 1602 may re-identify the unknown object image by preferentially using, among one or more registered object images stored in the registered object image storage unit 1502, a registered object image having the posture matching the posture of the unknown object detected from the unknown object image. That is, in the example of the unknown object image X1, the object re-identification unit 1602 may detect the posture 0° from the unknown object image X1, select the images A1, B4, and C2 having the same posture 0° from the registered object image storage unit 1502, and firstly use these three images in sequence to re-identify the unknown object image X1. As a result, reduction in the number of times of re-identification required until success of re-identification of the unknown object image X1 can be expected, so that the processing speed of re-identification can be much higher.

Second Exemplary Embodiment

Figure 9:
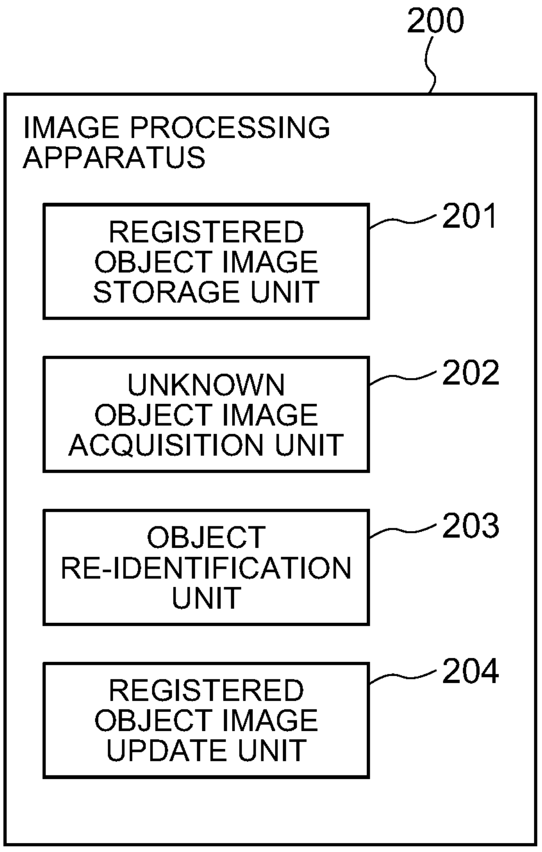
FIG. 9 is a block diagram illustrating an image processing apparatus according to a second exemplary embodiment of the present invention.

Next, a second exemplary embodiment of the present invention will be described with reference to the drawings. FIG. 9 is a block diagram of an image processing apparatus according to the present embodiment. The present embodiment describes an outline of the image processing apparatus of the present invention.

Referring to FIG. 9, an image processing apparatus 200 according to the present embodiment is configured to include a registered object image storage unit 201, an unknown object image acquisition unit 202, an object re-identification unit 203, and a registered object image update unit 204.

The registered object image storage unit 201 is configured to store therein at least one image of an object as a registered object image in association with an object identification number that uniquely identifies the object. Here, an object may be a person. An object may be an article other than a person. The registered object image storage unit 201 may have the same configuration as that of the registered object image storage unit 1502 of FIG. 1 for example, but is not limited thereto.

The unknown object image acquisition unit 202 is configured to acquire an unknown object image that is an image of an unknown object. The source from which an unknown object image is acquired may be a camera image, for example. The unknown object image acquisition unit 202 may have the same configuration as that of the unknown object image acquisition unit 1601 of FIG. 1, but it is not limited thereto.

The object re-identification unit 203 is configured to re-identify an unknown object image acquired by the unknown object image acquisition unit 202, by using the registered object image stored in the registered object image storage unit 201. The object re-identification unit 203 may have the same configuration as that of the object re-identification unit 1602 of FIG. 1 for example, but is not limited thereto.

The registered object image update unit 204 is configured to, when a condition is satisfied, the condition being that all registered object images stored in the registered object image storage unit 201 in association with the object identification number of the object in an unknown object image whose re-identification by the object re-identification unit 203 succeeded differ from the unknown object image, add the unknown object image to the registered object image storage unit 201 as a new registered object image, in association with the object identification number. The registered object image update unit 204 may have the same configuration as that of the registered object image update unit 1603 of FIG. 1 for example, but is not limited thereto.

The image processing apparatus 200 configured as described above operates as described below. The registered object image storage unit 201 stores therein at least one image of an object as a registered object image in association with an object identification number that uniquely identifies the object. Under this state, the unknown object image acquisition unit 202 acquires an unknown object image that is an image of an unknown object. Then, the object re-identification unit 203 re-identifies the unknown object image acquired by the unknown object image acquisition unit 202 by using the registered object image stored in the registered object image storage unit 201. Then, when a condition is satisfied, the condition being that all registered object images stored in the registered object image storage unit 201 in association with the object identification number of the object in the unknown object image whose re-identification by the object re-identification unit 203 succeeded differ from the unknown object image, the registered object image update unit 204 adds the unknown object image to the registered object image storage unit 201 as a new registered object image, in association with the object identification number.

According to the image processing apparatus 200 that is configured and operates as described above, it is possible to improve the accuracy of re-identification by increasing variations of the registered object images without uselessly increasing the number of the registered object images, that is, without lowering the processing speed of re-identification. This is because when a condition is satisfied, the condition being that all registered object images stored in the registered object image storage unit 201 in association with the object identification number of the object in the unknown object image whose re-identification by the object re-identification unit 203 succeeded differ from the unknown object image, the registered object image update unit 204 adds the unknown object image to the registered object image storage unit 201 as a new registered object image, in association with the object identification number.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to re-identification of a person and/or re-identification of an article such as belongings of a person. Moreover, the present invention can be applicable to a technology of detecting events such as desertion, carrying-away, and switching by a person.

The whole or part of the exemplary embodiments disclosed above can be described as, but not limited to, the following supplementary notes.

Supplementary Note 1

An image processing apparatus comprising:

a registered object image storage unit that stores at least one image of an object as a registered object image in association with an object identification number that uniquely identifies the object;

an unknown object image acquisition unit that acquires an unknown object image that is an image of an unknown object;

an object re-identification unit that re-identifies the acquired unknown object image by using the registered object image stored in the registered object image storage unit; and a registered object image update unit that, when a condition is satisfied, the condition being that all registered object images stored in the registered object image storage unit in association with the object identification number of the object in the unknown object image whose re-identification by the object re-identification unit succeeded differ from the unknown object image, adds the unknown object image to the registered object image storage unit as a new registered object image in association with the object identification number.

Supplementary Note 2

The image processing apparatus according to supplementary note 1, wherein when the condition is not satisfied, the registered object image update unit deletes the registered object image matching the unknown object image from the registered object image storage unit, and adds the unknown object image to the registered object image storage unit as a new registered object image in association with the object identification number.

Supplementary Note 3

The image processing apparatus according to supplementary note 1 or 2, wherein when determining whether or not the condition is satisfied, the registered object image update unit compares posture of a registered object detected from each of the one or more registered object images with posture of the unknown object detected from the unknown object image, and when there is no posture of the registered object that matches the posture of the unknown object, the registered object image update unit determines that the condition is satisfied.

Supplementary Note 4

The image processing apparatus according to supplementary note 3, wherein the registered object image update unit detects the posture of the registered object on a basis of skeletal information detected from the registered object image, and detects the posture of the unknown object on a basis of skeletal information detected from the unknown object image.

Supplementary Note 5

The image processing apparatus according to supplementary note 3 or 4, wherein the object re-identification unit re-identifies the acquired unknown object image by preferentially using, among the one or more registered object images stored in the registered object image storage unit, a registered object image having the posture matching the posture of the unknown object detected from the unknown object image.

Supplementary Note 6

The image processing apparatus according to supplementary note 1 or 2, wherein when determining whether or not the condition is satisfied, the registered object image update unit performs clustering on the one or more registered object images on a basis of a given feature value, creates a one-class identification plane for each of clusters obtained by the clustering, determines whether or not the unknown object image is in a class that is same as a class of the cluster by using the created one-class identification plane, and when determining that the unknown object image is in a class that is not same as any of classes of the clusters, the registered object image update unit determines that the condition is satisfied.

Supplementary Note 7

The image processing apparatus according to supplementary note 6, wherein the registered object image update unit performs the clustering on a basis of skeletal information detected from the registered object image.

Supplementary Note 8

The image processing apparatus according to any of supplementary notes 1 to 7, further comprising an object re-identification information storage unit that stores an object identification number of an object in the unknown object image in a frame image whose re-identification by the object re-identification unit succeeded, in association with capturing time of the frame image, wherein when the object re-identification unit re-identifies the unknown object image in a latest frame image, the object re-identification unit re-identifies the unknown object image in the latest frame image by using the registered object image stored in the registered object image storage unit in association with an object identification number of an object whose re-identification succeeded in a most recent frame image stored in the object re-identification information storage unit.

Supplementary Note 9

An image processing method comprising:

acquiring an unknown object image that is an image of an unknown object;

re-identifying the acquired unknown object image by using a registered object image stored in a registered object image storage unit, the registered object image storage unit storing at least one image of an object as the registered object image in association with an object identification number that uniquely identifies the object; and when a condition is satisfied, the condition being that all registered object images stored in the registered object image storage unit in association with the object identification number of the object in the unknown object image whose re-identification succeeded differ from the unknown object image, adding the unknown object image to the registered object image storage unit as a new registered object image in association with the object identification number.

Supplementary Note 10

A computer-readable medium storing thereon a program for causing a computer to execute processing to:

acquire an unknown object image that is an image of an unknown object;

re-identify the acquired unknown object image by using a registered object image stored in a registered object image storage unit, the registered object image storage unit storing at least one image of an object as the registered object image in association with an object identification number that uniquely identifies the object; and when a condition is satisfied, the condition being that all registered object images stored in the registered object image storage unit in association with the object identification number of the object in the unknown object image whose re-identification succeeded differ from the unknown object image, add the unknown object image to the registered object image storage unit as a new registered object image in association with the object identification number.

REFERENCE SIGNS LIST

100, 200 image processing apparatus
110 camera I/F unit
120 communication I/F unit
130 operation input unit

140 screen display unit
150 storage unit
160 arithmetic processing unit
171, 173 object identification number
172, 174 registered object image information
175 camera
181-185 frame image
201 registered object image storage unit
202 unknown object image acquisition unit
203 object re-identification unit
204 registered object image update unit
1501 program
1502 registered object image storage unit
1503 object re-identification information
1601 unknown object image acquisition unit
1602 object re-identification unit
1603 registered object image update unit
1721 posture number
1722, 1741 registered object image
1723, 1742 property

What is claimed is:

1. An image processing apparatus comprising:

a memory containing program instructions; and a processor coupled to the memory, wherein the processor is configured to execute the program instructions to:

store, in a storage apparatus, at least one image of an object as a registered object image in association with an object identification number that uniquely identifies the object, the at least one image being an image of any posture among of a predetermined plurality of postures of the object;

acquire an unknown object image that is an image of an unknown object;

detect a posture of the unknown object from the unknown object image;

in a case where the storage apparatus comprises a registered object image associated with a posture matching that of the unknown object, perform a first re-identification to determine whether the registered object image associated with the posture matching that of the unknown object and the unknown object image are images of the same object;

in a case where the first re-identification fails and the storage apparatus comprises a registered object image associated with a posture that does not match that of the unknown object, perform a second re-identification to determine whether the registered object image associated with the posture that does not match that of the unknown object and the unknown object image are images of the same object;

in a case where the second re-identification fails, assign a new object identification number to the unknown object and store the unknown object image in the storage apparatus as a new registered object image associated with the assigned object identification number and the posture of the unknown object; and in a case where at least one of the first re-identification of the second re-identification is successful:

in a case where a registered object image associated with the same posture as the unknown object is identified among the at least one registered object image stored in the storage apparatus using the object identification number, overwrite the same-posture registered object image with the unknown object image, and in a case where the registered object image associated with the same posture as the unknown object among the at least one registered object image stored in the storage apparatus is not identified using the object identification number, add the unknown object image to the storage apparatus as a new registered object image associated with the object identification number and the posture of the unknown object.

2. The image processing apparatus according to claim 1, wherein the processor is further configured to execute the instructions to:

detect the posture of the registered object on a basis of skeletal information detected from the registered object image, and detect the posture of the unknown object on a basis of skeletal information detected from the unknown object image.

3. The image processing apparatus according to claim 1, wherein the processor is further configured to execute the instructions to:

store, in the storage apparatus, an object identification number of an object in the unknown object image in a frame image whose re-identification succeeded, in association with capturing time of the frame image, and in a case where re-identifying the unknown object image in a latest frame image, re-identify the unknown object image in the latest frame image by using the registered object image stored in the storage apparatus in association with an object identification number of an object whose re-identification succeeded in a most recent frame image stored in the storage apparatus.

4. The image processing apparatus according to claim 1, wherein at least one of the first re-identification or the second re-identification is performed based on a determination of whether the unknown object is the same individual as an object associated with the registered object image, the determination being based on a comparison between at least one of a calculated probability or a statistical value with a predetermined threshold.

5. The image processing apparatus according to claim 1, wherein at least one of the first re-identification or the second re-identification is performed based on a machine learning model that is trained to estimate a probability of whether two object images are of the same object.

6. An image processing method comprising:

by a processor storing, in a storage apparatus, at least one image of an object as a registered object image in association with an object identification number that uniquely identifies the object, the at least one image being an image of any posture among of a predetermined plurality of postures of the object;

by the processor, acquiring an unknown object image that is an image of an unknown object;

by the processor, detecting a posture of the unknown object from the unknown object image;

by the processor, in a case where the storage apparatus includes a registered object image associated with a posture matching that of the unknown object, performing a first re-identification to determine whether the registered object image associated with the posture matching that of the unknown object and the unknown object image are images of the same object;

by the processor, in a case where the first re-identification fails and the storage apparatus includes a registered object image associated with a posture that does not match that of the posture of the unknown object performing a second re-identification to determine whether the registered object image associated with the posture that does not match that of the unknown object and the unknown object image are images of the same object;

by the processor, in a case where the second re-identification fails, assigning a new object identification number to the unknown object and storing the unknown object image in the storage apparatus as a new registered object image associated with the assigned object identification number and the posture of the unknown object; and in a case where the first re-identification or the second re-identification is unsuccessful, in a case where a registered object image being associated with the same posture as the unknown object is identified among the at least one registered object image stored in the storage apparatus using the object identification number, overwriting the same-posture registered object image with the unknown object image, and in a case where the registered object image being associated with the same posture as the unknown object among the at least one registered object image stored in the storage apparatus is not identified using the object identification number, adding the unknown object image to the storage apparatus as a new registered object image associated with the object identification number and the posture of the unknown object.

7. A non-transitory computer-readable medium storing thereon a program comprising instructions for causing a computer to execute processing to:

store in a storage apparatus, at least one image of an object as a registered object image in association with an object identification number that uniquely identifies the object, the at least one image being an image of any posture among of a predetermined plurality of postures of the object;

acquire an unknown object image that is an image of an unknown object;

detect a posture of the unknown object from the unknown object image;

in a case where the storage apparatus includes a registered object image associated with a posture matching that of the unknown object, perform a first re-identification to determines whether the registered object image associated with the posture matching that of the unknown object and the unknown object image are images of the same object;

in a case where the first re-identification fails and the storage apparatus includes a registered object image associated with a posture that does not match that of the unknown object perform a second re-identification to determine whether the registered object image associated with a posture that does not match that of the unknown object and the unknown object image are images of the same object;

in a case where the second re-identification fails, assign a new object identification number to the unknown object and store the unknown object image in the storage apparatus as a new registered object image associated with the assigned object identification number and the posture of the unknown object; and in a case where the result of either the first re-identification or the second re-identification is a success:

in a case where a registered object image being associated with the same posture as the unknown object is identified among the at least one registered object image stored in the storage apparatus using the object identification number, overwrite the same-posture registered object image with the unknown object image, and in a case where the registered object image being associated with the same posture as the unknown object among the at least one registered object image stored in the storage apparatus is not identified using the object identification number, add the unknown object image to the storage apparatus as a new registered object image associated with the object identification number and the posture of the unknown object.

* * * * *